United States Patent
Moshfeghi et al.

(10) Patent No.: US 10,014,731 B2
(45) Date of Patent: *Jul. 3, 2018

(54) BATTERY CHARGING STATION FOR WIRELESS BATTERY CHARGING

(71) Applicant: Golba LLC, Rancho Palos Verdes, CA (US)

(72) Inventors: Sina Moshfeghi, Rancho Palos Verdes, CA (US); Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/208,493

(22) Filed: Jul. 12, 2016

(65) Prior Publication Data
US 2016/0322833 A1 Nov. 3, 2016

Related U.S. Application Data

(63) Continuation of application No. 14/791,742, filed on Jul. 6, 2015, now Pat. No. 9,407,111, which is a (Continued)

(51) Int. Cl.
*H01M 10/44* (2006.01)
*H02J 50/40* (2016.01)
(Continued)

(52) U.S. Cl.
CPC .......... *H02J 50/40* (2016.02); *H02J 7/0004* (2013.01); *H02J 7/0027* (2013.01); *H02J 7/042* (2013.01);
(Continued)

(58) Field of Classification Search
CPC .................. H07J 7/0025; H07J 5/005
(Continued)

(56) References Cited

U.S. PATENT DOCUMENTS 5,999,124 A 12/1999 Sheynblat
6,131,067 A 10/2000 Girerd
(Continued)

FOREIGN PATENT DOCUMENTS

WO 2005/091997 10/2005

OTHER PUBLICATIONS

Auhor Unknown, "Energy Harvesting with Piezo Patch Transducers," Moving the NanoWorld, Jul. 10, 2010, 13 pages, Physik Instrumente, available at www.piceramic.de.
(Continued)

*Primary Examiner* — Edward Tso
(74) *Attorney, Agent, or Firm* — Farajami & Farajami LLP

(57) ABSTRACT

A battery charging station is equipped with radio frequency power transmitters, induction power transmitters, and ultrasound power transmitters so as to concurrently charge electronic devices. The battery charging station is operable to network the electronic devices through wireless communication. In this regard, the battery charging station may coordinate or arrange the radio frequency power transmitters, the induction power transmitters and/or the ultrasound power transmitters so that the resulting power transmission from the battery charging station to one or more intended networked electronic devices may be maximized. The battery charging station may wirelessly communicate with the electronic devices for device networking. The networked electronic devices may be connected to a computer network for various network services such as, for example, network advertising and software downloading or uploading. Both direct and in-direct device-to-device communication may be supported among the networked electronic devices. The battery charging station maintains data communication during battery charging.

28 Claims, 7 Drawing Sheets

Related U.S. Application Data continuation of application No. 13/421,500, filed on Mar. 15, 2012, now Pat. No. 9,077,188.

(51) Int. Cl.

| | | |
|---|---|---|
| H02J 7/00 | (2006.01) | |
| H02J 17/00 | (2006.01) | |
| H02J 7/04 | (2006.01) | |
| H02J 50/20 | (2016.01) | |
| H02J 50/10 | (2016.01) | |
| H02J 50/15 | (2016.01) | |

(52) U.S. Cl.
   CPC .............. *H02J 17/00* (2013.01); *H02J 50/10* (2016.02); *H02J 50/15* (2016.02); *H02J 50/20* (2016.02)

(58) Field of Classification Search
   USPC ................................. 320/107, 108; 307/104
   See application file for complete search history.

(56) References Cited

U.S. PATENT DOCUMENTS

| | | |
|---|---|---|
| 6,169,339 B1 | 1/2001 | Cripe |
| 6,185,427 B1 | 2/2001 | Krasner |
| 6,215,441 B1 | 4/2001 | Moeglein |
| 6,671,520 B1 | 12/2003 | Kim |
| 6,798,716 B1 | 9/2004 | Charych |
| 6,920,330 B2 | 7/2005 | Caronni |
| 6,972,543 B1 | 12/2005 | Wells |
| 7,400,253 B2 | 7/2008 | Cohen |
| 7,521,890 B2 | 4/2009 | Lee |
| 7,558,564 B2 | 7/2009 | Wesby |
| 7,610,092 B2 | 10/2009 | Cowan |
| 7,741,970 B2 | 6/2010 | Cunningham |
| 8,305,190 B2 | 11/2012 | Moshfeghi |
| 8,427,330 B2 | 4/2013 | Vorenkamp |
| 8,686,685 B2 | 4/2014 | Moshfeghi |
| 8,760,113 B2 | 6/2014 | Keating |
| 9,077,188 B2 | 7/2015 | Moshfeghi |
| 9,106,086 B2 | 8/2015 | Ning |
| 9,246,349 B2 | 1/2016 | Moshfeghi |
| 9,407,111 B2 * | 8/2016 | Moshfeghi ............ H02J 7/0027 |
| 9,559,544 B2 | 1/2017 | Jakubowski |
| 9,608,472 B2 | 3/2017 | Moshfeghi |
| 2004/0095241 A1 | 5/2004 | Maloney |
| 2004/0217865 A1 | 11/2004 | Turner |
| 2005/0030160 A1 | 2/2005 | Goren |
| 2005/0088284 A1 | 4/2005 | Zai |
| 2005/0104790 A1 | 5/2005 | Duron |
| 2005/0174094 A1 * | 8/2005 | Purdy .................. H02J 7/0052 320/134 |
| 2005/0198228 A1 | 9/2005 | Bajwa |
| 2005/0242188 A1 | 11/2005 | Vesuna |
| 2006/0022802 A1 | 2/2006 | Bridgelall |
| 2006/0047381 A1 | 3/2006 | Nguyen |
| 2006/0068750 A1 | 3/2006 | Burr |
| 2006/0083257 A1 | 4/2006 | Price |
| 2006/0113955 A1 | 6/2006 | Nunally |
| 2006/0130046 A1 | 6/2006 | O'Neill |
| 2006/0287740 A1 | 12/2006 | Ertel |
| 2007/0243851 A1 | 10/2007 | Shoarinejad |
| 2008/0100423 A1 | 5/2008 | Geissler |
| 2008/0100435 A1 | 5/2008 | Jorgenson |
| 2008/0111661 A1 | 5/2008 | Lin |
| 2008/0150364 A1 | 6/2008 | Chen |
| 2008/0191845 A1 | 8/2008 | Strzelczyk |
| 2008/0197804 A1 | 8/2008 | Onishi |
| 2008/0231449 A1 | 9/2008 | Moshfeghi |
| 2009/0058361 A1 | 3/2009 | John |
| 2009/0207013 A1 | 8/2009 | Ayed |
| 2009/0309704 A1 | 12/2009 | Chang |
| 2010/0027379 A1 | 2/2010 | Saulnier |
| 2010/0156610 A1 | 6/2010 | Wild |
| 2010/0181961 A1 * | 7/2010 | Novak .................... H02J 7/025 320/108 |
| 2010/0189440 A1 | 7/2010 | Julien |
| 2010/0201513 A1 | 8/2010 | Vorenkamp |
| 2010/0213895 A1 * | 8/2010 | Keating ................. H02J 7/02 320/108 |
| 2010/0259213 A1 | 10/2010 | Maharaj |
| 2010/0295663 A1 | 11/2010 | Shoarinejad |
| 2010/0297946 A1 | 11/2010 | Alameh |
| 2011/0050164 A1 | 3/2011 | Partovi |
| 2011/0057612 A1 | 3/2011 | Taguchi |
| 2011/0077513 A1 | 3/2011 | Rofougaran |
| 2011/0077714 A1 | 3/2011 | Rofougaran |
| 2011/0221388 A1 * | 9/2011 | Low ....................... H02J 5/005 320/108 |
| 2011/0258467 A1 | 10/2011 | Antoci |
| 2012/0057508 A1 | 3/2012 | Moshfeghi |
| 2012/0086394 A1 | 4/2012 | Hui |
| 2012/0235636 A1 | 9/2012 | Partovi |
| 2012/0326660 A1 * | 12/2012 | Lu ........................... H02J 17/00 320/108 |
| 2013/0091238 A1 | 4/2013 | Liu |
| 2013/0241468 A1 | 9/2013 | Moshfeghi |
| 2013/0241474 A1 | 9/2013 | Moshfeghi |
| 2014/0266025 A1 * | 9/2014 | Jakubowski ............ H02J 7/025 320/108 |
| 2015/0124713 A1 | 5/2015 | Salhov |
| 2016/0211705 A1 | 1/2016 | Moshfeghi |
| 2016/0322833 A1 | 11/2016 | Moshfeghi |
| 2016/0380472 A1 | 12/2016 | Moshfeghi |
| 2017/0047968 A1 | 2/2017 | Moshfeghi |
| 2017/0077742 A1 | 3/2017 | Moshfeghi |

OTHER PUBLICATIONS

Smulders, P.F.M., "60 GHz radio: prospects and future directions," Proceedings Symposium IEEE Benelux Chapter on Communications and Vehicular Technology, Month Unknown, 2003, pp. 1-8, Eindoven, The Netherlands.

Sodano, Henry A., et al., "A Review of Power Harvesting from Vibration Using Piezoelectric Materials," The Shock and Vibration Digest, vol. 36, No. 3, May 2004, pp. 197-205, Sage Publications.

Wells, Jonathan, "Multigigabit wireless technology at 70 GHz, 80 GHz and 90 GHz," May 2006, 5 pages.

Author Unknown, "Cisco Application-Oriented Networking Facilities Intelligent Radio Frequency Identification Processing at the Edge," Month Unknown, 2005. pp. 1-6, Cisco Systems Inc., USA.

Author Unknown, "ConnecTerra Product Family," www.connecterra.com, Month Unknown, 2005, pp. 1-2, ConnecTerra, Inc., Cambridge, Massachusetts, USA.

Author Unknown, "Delivering an Intelligent Foundation for RFID: Maximizing Network Efficiency With Cisco RFID Solutions," Month Unknown, 2005, pp. 1-6, Cisco Systems Inc., USA.

Author Unknown. "Establishing the Foundation for Enterprise-Scale RFID Deployments," www.connecterra.com/products/rftagaware.php, Month Unknown, 2004, pp. 1-2, ConnecTerra, Inc., Cambridge, Massachusetts, USA.

Author Unknown, "Four Challenges," Month Unknown, 2004, pp. 1-7, ConnecTerra, Inc., Cambridge, Massachusetts, USA.

Author Unknown, "Installation Manual R500HA Long Range RFID Reader," www.iaotomate.com, Month Unknown, 2005, pp. 1-31.

Author Unknown, "The Sun Global RFID Network Vision: Connecting Businesses at the Edge of the Network," A Technical White Paper, Jul. 2004, pp. 1-20, Sun Microsystems, Inc., Santa Clara, California, USA.

Author Unknown, "RFTag Aware.™ Enterprise Server, Centralized EPC Data Management and Reporting for Enterprise-Scale RFID Deployments," www.connecterra.com, Month Unknown, 2005, pp. 1-2, ConnecTerra, Inc., Cambridge, Massachusetts, USA.

Clark, Sean, et al., "Auto-ID Savant Specification 1.0," Sep. 2003, pp. 1-58, Auto-ID Center.

Miller, Leonard E., "Why UWB? A Review of Ultrawideband Technology," Wireless Communication Technologies Group, National Institute of Standards and Technology, Apr. 2003, pp. 1-72, Gaithersburg, Maryland, USA.

(56) References Cited

OTHER PUBLICATIONS

Miller, Leonard E., "Wireless Technologies and the SAFECOM SoR for Public Safety Communications," Wireless Technologies Group, Advanced Network Technologies Division, Information Technology Laboratory, National Institute of Standards and Technology, Month Unknown, 2005, pp. 1-68, Gaithersburg, Maryland, USA.

Reynolds, Matthew, et al., "Design Considerations for Embedded Software-Defined RFID Readers," www.rfdesign.com, Emerging Wireless Technology/ A Supplement to RF Design, Aug. 2005, pp. 14-15.

\* cited by examiner

BATTERY CHARGING STATION FOR WIRELESS BATTERY CHARGING

CLAIM OF BENEFIT TO PRIOR APPLICATIONS

This patent application is a continuation application of U.S. patent application Ser. No. 14/791,742, filed Jul. 6, 2015, which is a continuation application of U.S. patent application Ser. No. 13/421,500, filed Mar. 15, 2012, now U.S. Pat. No. 9,077,188, which are incorporated herein by reference.

CROSS-REFERENCE TO RELATED APPLICATIONS/INCORPORATION BY REFERENCE

This application makes reference to:
U.S. application Ser. No. 12/979,254 filed on Dec. 27, 2010; and
U.S. application Ser. No. 13/421,476 filed on Mar. 15, 2012

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for a battery charging station using multiple types of power transmitters for wireless battery charging.

BACKGROUND OF THE INVENTION

Portable devices such as mobile phones, laptop computers, tablets, and other communication device often rely on electrical battery energy to conduct communications. Electrical batteries store chemical energy and deliver electrical energy through an electrochemical conversion process. An electrical battery consists of one or more cells, organized in an array. Each cell consists of an anode, a cathode, and an electrolyte that separates the two electrodes and allows the transfer of electrons as ions between them. Chemical material that originates chemical reactions within the cell is called active material. In practice, the energy that can be obtained from a cell is fundamentally limited by the quantity of active material contained in the cell. Electrical batteries may be non-rechargeable or rechargeable. Although some portable devices may use non-rechargeable batteries, the vast majority depend on rechargeable batteries. Portable devices run on batteries. Display, hard disk, logic, and memory are the device components with the greatest impact on power consumption; however, when a wireless interface is added to a portable system, power consumption increases significantly. For example, even when not making a call, mobile phones keep listening to the network over wireless interfaces to keep in touch with the network in case a call comes in. Batteries with features such as a long lifetime, a lightweight, and a small size are highly desirable in portable wireless devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a battery charging station using multiple types of power transmitters for wireless battery charging, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a battery charging station using multiple types of power transmitters for wireless battery charging. In accordance with various exemplary embodiments of the invention, a battery charging station is equipped with radio frequency power transmitters, induction power transmitters, and ultrasound power transmitters. The battery charging station may be operable to concurrently charge a plurality of electronic devices utilizing the RF power transmitters, the induction power transmitters, and the ultrasound power transmitters. The battery charging station may network the electronic devices through wireless communication. In this regard, the battery charging station may coordinate or arrange the RF power transmitters, the induction power transmitters and/or the ultrasound power transmitters so that the resulting power transmission from the battery charging station to one or more intended networked electronic devices may be maximized. In an embodiment of the invention, the battery charging station may wirelessly communicate with the electronic devices for device networking.

The battery charging station may be operable to provide networking functions and connect the networked electronic devices to a computer network for various network services, for example, network advertising and software downloading or uploading. Using the networking functionality of the battery charging station, both direct and in-direct device-to-device communication may be supported among the networked electronic devices. The battery charging station may dedicate a portion of the power transmitters to optimize data communication with the electronic devices, while the rest may be utilized and optimized for charging the electronic devices.

Figure 1:
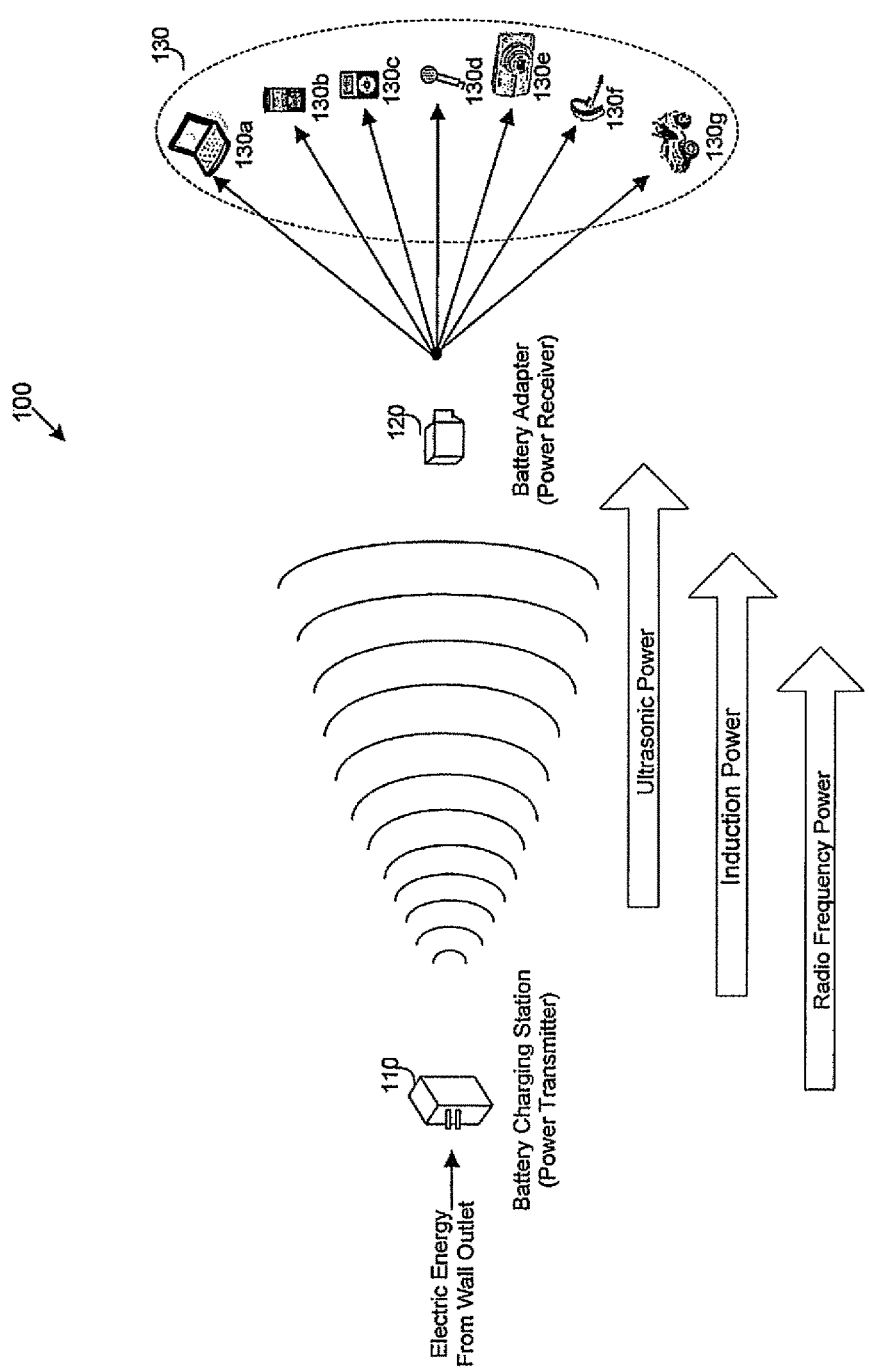
FIG. 1 is a diagram illustrating an exemplary communication system that is operable to wirelessly charge electrical batteries utilizing multiple types of power transmitters, in accordance with an embodiment of the invention.

FIG. 1 is a diagram illustrating an exemplary communication system that is operable to wirelessly charge electrical batteries utilizing ultrasound, in accordance with an embodiment of the invention. Referring to FIG. 1, there is shown a communication system 100. The communication system 100 comprises a battery charging station 110, a battery adapter 120 and a plurality of electronic devices 130, of which electronic devices 130a through 130g are illustrated.

The battery charging station 110 may comprise suitable logic, circuitry, interfaces and/or code that are operable to concurrently charge a plurality of electronic devices utilizing ultrasound power, induction power, and radio frequency (RF) power. In this regard, the battery charging station 110 may be operable to convert electric power from electrical sources such as an electrical wall outlet into ultrasound energy, induction energy, and RF energy. In an embodiment of the invention, the battery charging station 110 may be operable to wirelessly charge electrical batteries of intended objects such as the electronic devices 130a-130g by emitting or transmitting ultrasound energy, induction energy, and/or RF energy to the electronic devices 130a-130g.

The battery charging station 110 may be operable to select which electronic device to power up and communicate with. The electronic devices 130a-130g may be identified through various device identification information such as media access control address (MAC ID), network IP address, name, serial number, product name and manufacturer, and/or capabilities. The battery charging station 110 may acquire the device IDs from the electronic devices 130a-130g to prioritize charging. In an exemplary embodiment of the invention, an electronic device may function as a battery charging station. For example, in some instances, an electronic device may comprise power receivers and power transmitters. The battery charging station 110 may charge such an electronic device and the electronic device may then charge another electronic device that needs to be charged. The battery charging station 110 may comprise a credit card reader so that users of the electronic devices 130a-130g may not only charge their devices but also make payment transactions. For example, phones with near field communication (NFC) capabilities may not only be charged but they may also be used for contactless payment so that the users place the phones near the charging station 110 in order to transmit payment information to a secured server on the Internet. Alternatively, the charging station 110 may receive credit card information through chips embedded in the credit cards, for example. The battery charging station 110 may be built-in to conference room tables, office tables or lightweight pads so that meeting participants may wirelessly charge their devices, connect to each other or to the Intranet/Internet, transmit/receive information, and/or make payment transactions.

The battery adapter 120 may comprise suitable logic, circuitry, interfaces and/or code that are operable to sense or detect signals emitted from the battery charging station 110. In this regard, the signals from the battery charging station 110 may comprise ultrasonic signals, induction signals and/or RF signals. The battery adapter 120 may be operable to convert the corresponding received energy such as ultrasound energy, induction energy and RF energy back into electrical power to charge electrical batteries of the electronic devices 130a-130g.

The electronic devices 130a-130g may comprise suitable logic, circuitry, interfaces and/or code that are operable to utilize electrical battery energy to conduct communications for desired services. The electronic devices 130a-130g may be wirelessly charged without using cables or AC adapters. In this regard, ultrasound energy, induction energy, and/or electric energy emitted or transmitted from the battery charging station 110 may be utilized to charge or power batteries of the electronic devices 130a-130g.

Although a single stand-alone battery adapter is illustrated in FIG. 1 for wirelessly charge electrical batteries utilizing ultrasound, the invention may not be so limited. Accordingly, each electronic device may have its own battery adapter, or the charging station may have multiple battery adapters utilized to wirelessly charge one or more electronic devices without departing from the spirit and scope of various embodiments of the invention.

In an exemplary operation, the battery charging station 110 may receive or capture electrical power and convert the electrical power into ultrasound energy, induction energy, and RF energy. The battery charging station 110 may be operable to transmit the ultrasound energy, induction energy, and RF energy to the battery adapter 120. The battery adapter 120 may sense or receive the ultrasound energy, the induction energy, and the RF energy wirelessly emitted from the battery charging station 110. The battery adapter 120 may convert the received ultrasound energy, the induction energy, and the RF energy back into electrical power. The battery adapter 120 may utilize the electrical power to wirelessly charge batteries for devices such as the electronic devices 130a-130g.

Figure 2:
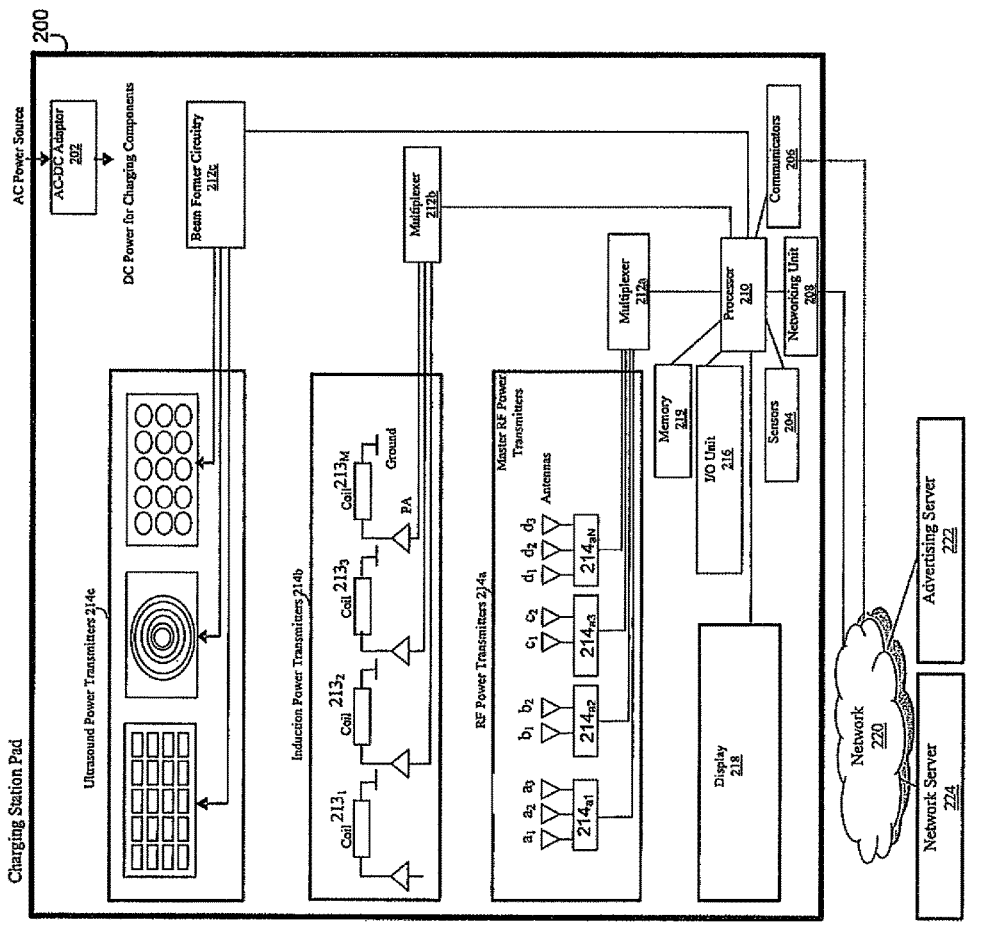
FIG. 2 is a diagram illustrating an exemplary battery charging station with multiple types of power transmitters for wireless battery charging, in accordance with an embodiment of the invention.

FIG. 2 is a diagram illustrating an exemplary battery charging station with multiple types of power transmitters for wireless battery charging, in accordance with an embodiment of the invention. Referring to FIG. 2, there is shown a battery charging station 200. The battery charging station 200 comprises an AC-DC adaptor 202, a plurality of sensors 204, communicators 206, a networking unit 208, a processor 210, multiplexers 212a and 212b, a beam former circuitry 212c, an RF power transmitters 214a, an induction power transmitters 214b, an ultrasound power transmitters 214c, an I/O unit 216, a display 218 and a memory 220.

The battery charging station 200 may comprise suitable logic, circuitry, interfaces and/or code that are operable to convert electric power into inaudible ultrasound energy, induction energy and radio frequency energy.

The AC-DC adaptor 202 may comprise suitable logic, circuitry, interfaces and/or code that are operable to convert AC power into DC power to power or charge associated device components such as the display 218 for battery charging station 200.

The sensors 204 may comprise suitable logic, circuitry, interfaces and/or code that are operable to sense power or signals. The sensors 204 may capture and receive sensed signals and communicate with the processor 210 so that the processor uses that information for optimal charging or transmits the sensed signals over the communicators 206 and/or the networking unit 208, for example. In one embodiment sensors 204 may sense the location of the battery adapter 120 of an electronic device such as the electronic device 130a. The sensors 204 may provide that location information to the processor 210 so that battery charging station 110 may use optimal parameters for its power transmitters 214a, 214b, and 214c to achieve high power charging efficiency. For example, the processor 210 may be operable to use the beam former circuitry 212c to configure the ultrasound power transmitter 214c and activate a subset of its ultrasound transducers that may be in close proximity of the battery adapter 120. The processor may also be operable to instruct or signal the beam former circuitry 212c to focus the ultrasound beam and its energy on the sensed location of the battery adapter 120. The RF power transmitter 214a may comprise multiple RF transceivers $214_{a1}$ through $214_{aN}$, each of which may have multiple antennas such as antennas $a_1$-$a_3$, $b_1$-$b_2$, $c_1$-$c_2$, and $d_1$-$d_3$, for the RF transceivers $214_{a1}$ through $214_{aN}$, respectively. The processor 210 may use the multiplexer 212a to activate one or more of the RF transceivers $214_{a1}$ through $214_{aN}$ that may be optimally positioned and/or may enable the right antenna orientation for the sensed location of the battery adapter 120. The processor 210 may then configure each RF transceiver with appropriate parameters such as transmit power, RF frequency, antenna pattern and direction, RF beam polarization, and/or channel coding. The processor 210 may also use the multiplexer 212b to supply one or more of the coils $213_1$ through $213_M$ of the multiplexer 214b that may be near the sensed position of the battery adapter 120 with an alternating current, thereby creating an AC magnetic field near one or more of the coils $213_1$ through $213_M$ of the battery adapter 120.

The communicators 206 may comprise suitable logic, circuitry, interfaces and/or code that are operable to communicate signals at appropriate frequency bands such as a radio frequency band, an induction frequency band, and an ultrasound frequency band. In this regard, the communicators 206 may be operable to capture and receive electric power by communicating RF signals, mm-wave (mmW) signals, induction signals and/or ultrasonic signals with appropriate networks.

The networking unit 208 may comprise suitable logic, circuitry, interfaces and/or code that are operable to communicate radio frequency power, induction power, and ultrasound power with electronic devices for wirelessly battery charging.

The processor 210 may comprise suitable logic, circuitry, interfaces and/or code that may be operable to manage, coordinate and/or control operations of associated device component units such as, for example, the communicators 206 and the networking unit 208, depending on usages. For example, the processor 210 may be operable to activate or deactivate the networking unit 208 on an as needed basis in order to save power. The processor 210 may also be operable to transmit and receive video, voice and data using networking unit 208 or communicators 206. Depending on device capabilities and user preferences, the processor 210 may be operable to determine or select which electronic devices such as the electronic devices 130a-130b within a geographic area of interest are to be wirelessly charged. The processor 210 may coordinate with the multiplexers 212a and 212b and the beam former circuitry 212c such that the RF power transmitters 214a, the induction power transmitters 214b and/or the ultrasound power transmitters 214c may be activated to transmit RF power, induction power and/or ultrasound power, respectively. In this regard, the processor 210 may coordinate or arrange the RF power transmitters 214a, the induction power transmitters 214b and/or the ultrasound power transmitters 214c so that the resulting power transmission from the battery charging station 200 to intended objects such as the electronic device 130a may be maximized. In an embodiment of the invention, the processor 210 may use the sensors 204 to sense the location of the battery adapter 120, as well as other parameters, so as to maximize the efficiency of power transfer between the battery charging station 110 and the battery adapter 120.

In an embodiment of the invention, the processor 210 may be operable to concurrently charge the electronic devices 130a-130b utilizing the RF power transmitters 214a, the induction power transmitters 214b and/or the ultrasound power transmitters 214c. The processor 210 may be operable to network the electronic devices 130a-130g through wireless communication. The networked electronic devices 130a-130g may be engaged in direct or in-direct device-to-device communication. With direct device-to-device communication, the processor 210 may be operable to monitor the networked electronic devices 130a, 130b and 130c directly communicating from one to another without intervening the battery charging station 200 in-between. In this regard, the direct device-to-device communication may comprise communication between the networked electronic devices utilizing Bluetooth or Near field communication (NFC). The direct device-to-device communication may also comprise communication between the networked electronic devices through other networks utilizing WLAN access points or base stations, for example. With in-direct device-to-device communication, the processor 210 may operate as a router that routes or controls routing of data packets among the networked electronic devices 130a-130g as needed. In an embodiment of the invention, the processor 210 may be operable to connect the networked electronic devices 130a-130g to a computer network such as the Internet. In this regard, the processor 210 may be enabled to support various network applications such as network advertising, software and/or media data uploading or downloading, email, chat, web browsing, video conferencing, web services and/or web applications between the computer network and the networked electronic devices 130a-130g, for example.

In an embodiment of the invention, the processor 210 may be operable to select which electronic device to power up and communicate with. In this regard, the processor 210 may acquire device identification information from the networked electronic devices 130a-130g. The acquired device identification information may comprise media access control address (MAC ID), network IP address, name, serial number, product name and manufacturer, capabilities. The processor 210 may store the acquired device identification information in the memory 219 for device registration, for example. The processor 210 may access the stored device identification information so as to authorize and prioritize the electronic devices 130a-130g for charging. In an exemplary embodiment of the invention, the processor 210 may be operable to store the acquired device identification information on servers such as the network server coupled to the network 220. The processor 210 may determine device charging priorities for the electronic devices 130a-130g based on subscription levels, content to be communicated, and/or device functions. The processor 210 may ensure an electronic device with higher priority is charged first or is given more charging time than an electronic device with a lower priority.

The multiplexer 212a may comprise suitable logic, circuitry, interfaces and/or code that may be operable to up-convert baseband signals supplied from the processor 210 to RF signals. The RF power transmitters 214a may comprise suitable logic, circuitry, interfaces and/or code that may be operable to transmit the RF signals to intended objects such as the electronic devices 130a-130g for wirelessly battery charging. The RF power transmitter 214a may be controlled by the processor 210. The RF power transmitter 214a may comprise a number of transmitter modules or RF transceivers $214_{a1}$ through $214_{aN}$. Each transmitter module may comprise a number of high gain antennas, for example, the antennas $a_1$-$a_3$, such that through different phases and amplitudes the transmitter may use beam steering to change the angle of its RF beam. With regard to RF power, the processor 210 may use the multiplexer 212a to transmit power with a subset of the RF transceivers $214_{a1}$ through $214_{aN}$ and configures corresponding antennas such that the RF beam may be focused on the location of the RF power receiver 312 of electronic device 130a, for example. The transmitted RF waves may not be modulated since they may be used for power generation, but not data transmission. With regard to induction power, the induction power transmitter 214b may be controlled by the processor 210 which may instruct or signal the multiplexer 212b to supply one or more of the coils $213_1$ through $213_M$ with an alternating current, thereby creating an AC magnetic field. The magnetic field may generate a voltage across one or more of the coils 316b of the induction power receiver 316. The generated voltage may be processed and utilized for charging. In an exemplary embodiment of the invention, the processing may comprise regulation, rectification and/or smoothing by using one or more capacitors.

The beam former circuitry 212c may comprise suitable logic, circuitry, interfaces and/or code that may be operable to steer and focus ultrasound beams to objects of interest. In this regard, the beam former circuitry 212c may be operable to drive or activate associated transmit ultrasonic transducers to produce beams of sound to be steered and focused on intended objects such as the electronic devices 130a-130g. The ultrasound power transmitters 214c may comprise suitable logic, circuitry, interfaces and/or code that may be operable to transmit ultrasonic signals to intended objects such as the electronic devices 130a-130g to wirelessly charge electrical batteries utilized by the electronic devices 130a-130g. The ultrasound power transmitters 214c may be equipped with linear, planar, circular or hexagonal antenna arrays so as to cover reflections in the multipath environment between the battery charging station 200 and the intended objects to be charged.

The I/O unit 216 may comprise suitable logic, circuitry, interfaces and/or code that may be operable to control or manage different I/O devices such as the display 218.

The display 218 may comprise suitable logic, circuitry, interfaces and/or code that may be operable to present information in visual form. In this regard, the display 218 may be utilized to present network advertising content to the owners of the electronic devices that are being charged. The display 218 may use, but is not limited to, a cathode ray tube (CRT), liquid crystal display (LCD), gas plasma, digital light processing or other image projection technology.

The memory 219 may comprise suitable logic, circuitry, interfaces and/or code that may be operable to store information such as executable instructions and data that may be utilized by the processor 210 and/or other associated component units such as, for example, the ultrasound power transmitters 214c. The memory 219 may store device identification information acquired from the electronic devices 130a-130g. The device identification information may comprise information such as media access control address (MAC ID), network IP address, name, serial number, product name and manufacturer, capabilities. The device identification information may be accessed and utilized by the processor 210 to authorize, register, and/or prioritize the electronic devices 130a-130g for charging. The memory 219 may comprise RAM, ROM, low latency nonvolatile memory such as flash memory and/or other suitable electronic data storage.

The network 220 may be a computer network. The network 220 may comprise an intranet, extranet and/or the Internet. An intranet may utilize Internet Protocol (IP) technology to securely share an organization's information or network operating system. An extranet may be a private network that uses Internet protocols and network connectivity. The Internet is a global system of interconnected computer networks that may utilize the standard Internet Protocol Suite (TCP/IP) to serve users worldwide.

The advertising server 222 may be utilized to generate generic advertisements to be received by the network server 224. The network server 224 is a computer or device on a network that manages network resources. The network server 224 may be operable to process requests and deliver data to other computers over a local network or the Internet. In this regard, the network server 224 may deliver advertisement content supplied from the advertising server 222 to the battery charging station 200. In other embodiments the advertising server 222 may serve advertisement content directly to the battery station 200. The advertisements may be displayed on the networked electronic devices, for example, when they are being charged and/or not being utilized. The advertisements may comprise text, graphics, video and/or audio. In an exemplary embodiment of the invention, the network server 224 may act as a master and may instruct the processor 210 to perform functions such as, for example, monitoring the power status of a plurality of electronic devices and decide which subset of those devices are charged and with what priority. An authorized user may also use a network to connect to the network server 224 and control the network server 224, which in turn controls the processor 210 and the battery charging station 200. The network server 224 may also control direct/indirect communication between two charged electronic devices.

In an exemplary operation, the battery charging station 200 may capture or receive AC power from electrical power sources such as an electrical wall outlet. The AC-DC adaptor 202 may convert the captured AC power into DC power to charge associated device components such as the display 218 and power transmitters. The RF power transmitters 214a, the induction power transmitters 214b and/or the ultrasound power transmitters 214c may be utilized to concurrently charge intended objects such as the electronic devices 130a-130g. The processor 210 may network the electronic devices 130a-130g to enable device-to-device communication among the electronic devices 130a-130g. The networked electronic devices 130a-130g may be connected via the networking unit 208 to the network 220 for various network applications or services such as, for example, network advertising, software uploading and downloading, email, chat, web browsing, video conferencing, web services and/or web applications.

The battery charging station 200 may be configured such that it may use the wireless communicators 206 and/or the wired networking unit 208 to communicate with electronic devices. In exemplary embodiments of the invention, the RF power transmitters 214a, the induction power transmitters 214b, and the ultrasound power transmitters 214c may not only be used to charge electronic devices but they may also be operable to transmit and receive data. In such a case, a portion of the ultrasound power transmitters of 214c, a portion of the coils $213_1$ through $213_M$ of the induction power transmitters 214b, and a portion of the RF transceivers $214_{a1}$ through $214_{aN}$ of the RF power transmitters 214a may be dedicated and optimized for data communication with one or more of the electronic devices 130a-130g, while others may be optimized for charging the one or more electronic devices 130a-130g. Command and control information between the charging station 200 and the electronic devices 130a-130g may also be exchanged on the wireless communicators 206, on the power transmitters 214a, 214b, and 214c, or on a separate dedicated control channel. In addition, the battery charging station 200 may itself have a wireless charging adapter with an induction power receiver, an ultrasound power receiver, and a RF power receiver so that the charging station 200 may be charged in case there is no AC power source. In an exemplary embodiment of the invention, the transducer elements of the ultrasound power transmitter 214c may comprise different center frequencies, frequency bandwidth and/or transmission ranges such that some may be more suitable for short distances and others may be more suitable for longer distances.

Figure 3:
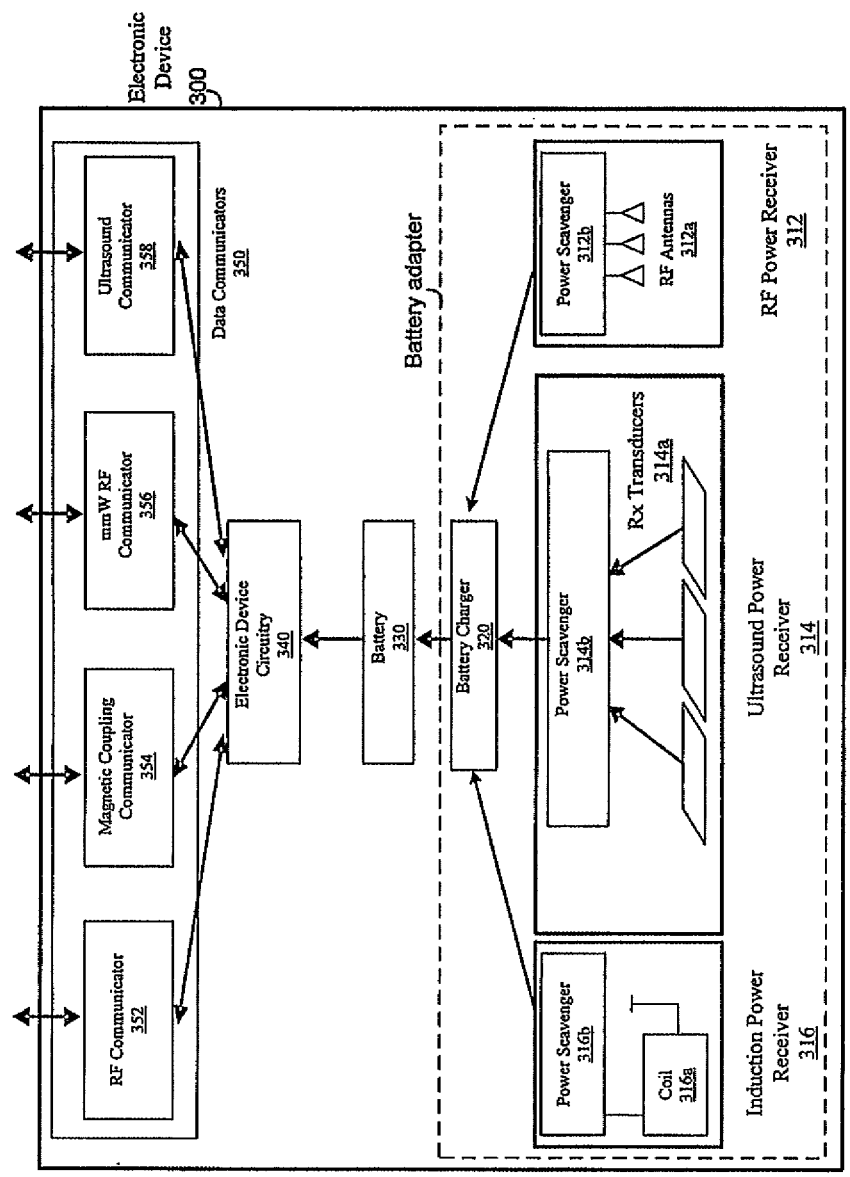
FIG. 3 is a diagram illustrating an exemplary electronic device with multiple types of power receivers for wireless battery charging, in accordance with an embodiment of the invention.

FIG. 3 is a diagram illustrating an exemplary electronic device with multiple types of power receivers for wireless battery charging, in accordance with an embodiment of the invention. Referring to FIG. 3, there is shown an electronic device 300. The electronic device 300 comprises an RF power receiver 312, an induction power receiver 316, an ultrasound power receiver 314, a battery charger 320, a battery 330, an electric device circuitry 340, and data communicators 350.

The electronic device 300 may comprise suitable logic, circuitry, interfaces and/or code that are operable to conduct communications utilizing battery energy. In this regard, the electronic device 300 may be wirelessly charged utilizing RF energy, induction energy and ultrasound energy emitted from the RF power transmitters 214a, the induction power transmitters 214b and the ultrasound power transmitters 214c, respectively.

The RF power receiver 312 may comprise suitable logic, circuitry, interfaces and/or code that may be operable to receive and decode RF signals for use. The RF power receiver 312 may comprise a plurality of directional antennas 312a that are connected to the power scavenger 312b. The RF transmissions of the RF power transmitter 214a may be received by the antennas 312a. The energy of the received RF signals may be converted by the power scavenger 312b to a supply voltage. In an exemplary embodiment of the invention, the supply voltage may be stored in one or more capacitors. The supply voltage may be then provided to the battery charger 320.

The ultrasound power receiver 314 may comprise suitable logic, circuitry, interfaces and/or code that may be operable to receive and decode ultrasound signals for use as power. The ultrasound power receiver 314 may be fitted on the electronic device 300, for example; in the shape of associated mating materials such as pad and back cover of the electronic device 300. The ultrasound power receiver 314 comprises a plurality of receiver (Rx) ultrasonic transducers 314a and a power scavenger 314b. The Rx ultrasonic transducers 314a may comprise suitable logic, circuitry, interfaces and/or code that may be operable to detect or sense ultrasound waves. In this regard, the Rx ultrasonic transducers 314a may be operable to receive ultrasound signals emitted from the ultrasound power transmitters 214c. The Rx ultrasonic transducers 314a may receive the ultrasound waves transmitted by the ultrasound power transmitter 214c and convert the ultrasound energy into electrical signals. The generated voltage across the transducers 314a may be then processed by the power scavenger 314b such that it may be used for charging. The power scavenger 314b may feed or provide the combined ultrasonic signals to the battery charger 320.

The induction power receiver 316 may comprise suitable logic, circuitry, interfaces and/or code that may be operable to receive induction power. The induction power receiver 316 may comprise a coil 316a and a power scavenger 316b. Although a single receive coil 316a is illustrated in FIG. 3 for wirelessly charge electrical batteries, the invention may not be so limited. Accordingly, multiple receive coils may be included in a battery charger for wireless charging without departing from the spirit and scope of various embodiments of the invention.

With regard to induction power, the induction power transmitter 214b may be controlled by the processor 210, which instructs the multiplexer 212b to supply one or more of its coils with an alternating current, thereby creating an AC magnetic field. The magnetic field may generate a voltage across the coil 316a of the induction power receiver 316. The generated voltage may then be processed by the power scavenger 316b such that it may be used for charging. In an exemplary embodiment of the invention, the processing may comprise rectification and/or smoothing by using one or more capacitors. The power scavenger 316b may supply the power received to the battery charger 320.

The battery charger 320 may comprise suitable logic, circuitry, interfaces and/or code that may be operable to energy supplied from the power scavengers 312b, 314b, and 316b, so as to charge the battery 320 for the electronic device 300. For example, the battery charger 320 may convert the supplied energy to a stable DC voltage to charge the battery 330.

The battery 330 may comprise suitable logic, circuitry, interfaces and/or code that may be operable to read or receive electric current flowing into the battery 330. The battery 330 may be wirelessly charged by the RF power transmitters 214a, the induction power transmitters 214b, and the ultrasound power transmitters 214c without using cables or plugging in the electronic device 300.

The electronic device circuitry 340 may comprise suitable logic, circuitry, interfaces and/or code that may be operable to handle various applications supported by the electronic device 300. For example, with the electronic device 300 operating as a cellular telephone, the electronic device circuitry 340 may be configured to handle or place cellular telephone calls through appropriate communicators such as a CDMA radio. In an embodiment of the invention, the electronic device circuitry 340 may be operable to communicate with the battery charging station 200 to enable networking with other electronic devices such as the electronic devices 130a-130g. In this regard, the electronic device circuitry 340 may be enabled to perform direct or in-direct device-to-device communication with the networked electronic devices such as the electronic devices 130a-130g. In an embodiment of the invention, the electronic device circuitry 340 may be connected to the network 220 via the battery charging station 200 to access various network services such as, for example, network advertising, software uploading and downloading, email, chat, web browsing, video conferencing, web services and/or web applications.

In an embodiment of the invention, the electronic device circuitry 340 may be operable to provide device identification information to the battery charging station 200. The device identification information may comprise media access control address (MAC ID), network IP address, name, serial number, product name and manufacturer, capabilities. The device identification information may be utilized by the battery charging station 200 to authorize and prioritize the electronic device 300 for charging.

The data communicators 350 may comprise suitable logic, circuitry, interfaces and/or code that are operable to transmit and/or receive signals for data communication at appropriate frequency bands such as a cellular radio frequency band and a Bluetooth radio band. In this regard, the data communicators 350 may be equipped with a RE communicator 352, a magnetic coupling communicator 354, an mmW RF communicator 356, and an ultrasound communicator 358 to communicate RF signals, magnetic signals, mmW RF signals and/or ultrasonic signals, respectively.

In an exemplary operation, power receivers such as the RF power receiver 312, the ultrasound power receiver 314, and the induction power receiver 316 may concurrently detect and receive RF signals, ultrasound signals, and induction signals transmitted from the RF power transmitters 214a, the ultrasound power transmitters 214c, and the induction power transmitters 214b, respectively. The received RF signals, induction signals and ultrasound signals are converted into electrical power by power scavenger 312b, 316b, and 314b, respectively, and are fed to the battery charger 320 to provide electric power to charge the battery 330. The battery 330 may output electric power to the electronic device circuitry 340. The data communicators 350 may communicate with the network 220 and other networked electronic devices for desired services. For example, the data communicators 350 may utilize a secure IP connection to provide users of the electronic device 300 with access to various networking services such as email, chat, web browsing, video conferencing, web services and/or web applications.

Figure 4:
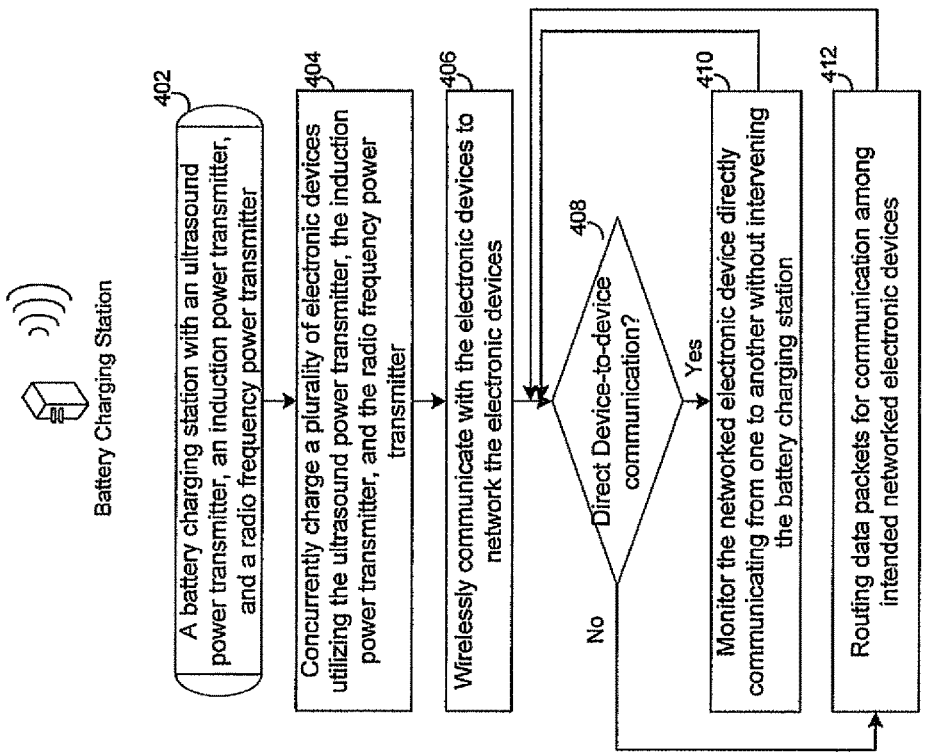
FIG. 4 is a diagram illustrating exemplary steps utilized by a battery charging station to network electronic devices and support device-to-device communication, in accordance with an embodiment of the invention.

FIG. 4 is a diagram illustrating exemplary steps utilized by a battery charging station to network electronic devices and support device-to-device communication, in accordance with an embodiment of the invention. Referring to FIG. 4, in step 402, the battery charging station 200 is equipped with the RF power transmitters 214a, the induction power transmitters 214b, and the ultrasound power transmitters 214c. The exemplary steps start with step 404, where the battery charging station 200 may be operable to concurrently charge a plurality of electronic devices such as the electronic devices 130a-130g utilizing the RF power transmitters 214a, the induction power transmitters 214b, and the ultrasound power transmitters 214c. In step 406, the battery charging station 200 may wirelessly communicate with the electronic devices 130a-130g to network the electronic devices 130a-130g. In step 408, it may be determined whether direct device-to-device communication is expected among the networked electronic devices 130a-130g. In instances where a direct device-to-device communication is preferred, then in step 410, the battery charging station 200 may monitor the networked electronic devices 130a-130g directly communicating from one to another without intervening the battery charging station 200.

In step 408, in instances where an in-direct device-to-device communication is preferred, then in step 412, the battery charging station 200 may route data packets for communication among intended networked electronic devices such as the networked electronic devices 130a-130g.

Figure 5:
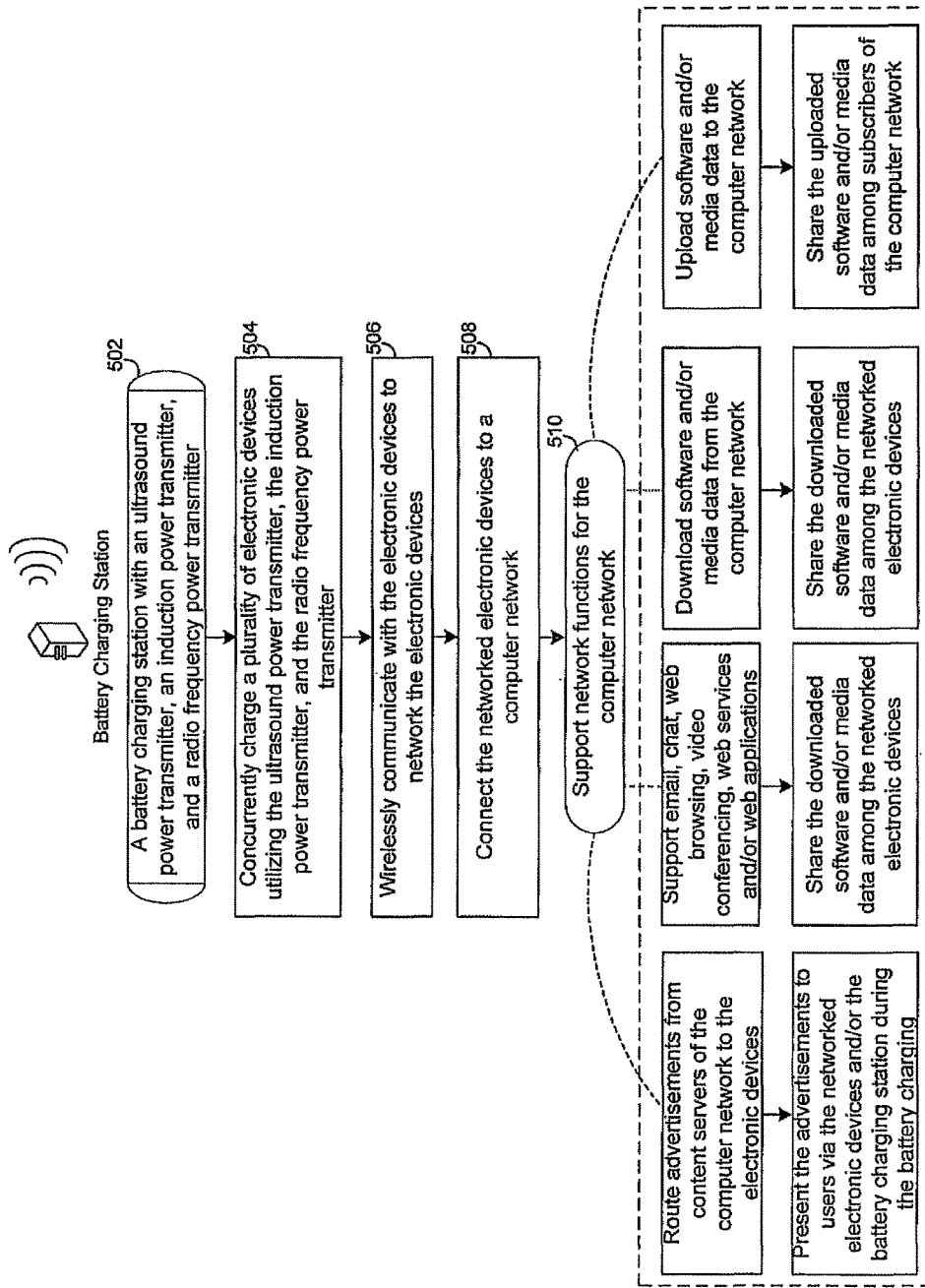
FIG. 5 is a diagram illustrating exemplary steps utilized by a battery charging station to connect electronic devices to a computer network to support network functions, in accordance with an embodiment of the invention.

FIG. 5 is a diagram illustrating exemplary steps utilized by a battery charging station to connect electronic devices to a computer network to support network functions, in accordance with an embodiment of the invention. Referring to FIG. 5, in step 502, the battery charging station 200 is equipped with the RF power transmitters 214a, the induction power transmitters 214b, and the ultrasound power transmitters 214c. The exemplary steps start with step 504, where the battery charging station 200 may be operable to concurrently charge a plurality of electronic devices such as the electronic devices 130a-130g utilizing the RF power transmitters 214a, the induction power transmitters 214b, and the ultrasound power transmitters 214c. In step 506, the battery charging station 200 may wirelessly communicate with the electronic devices 130a-130g to network the electronic devices 130a-130g. In step 508, the battery charging station 200 may connect the networked electronic devices 130a-130g to a computer network such as the network 220. In step 510, the battery charging station 200 may be enabled to support network functions for the network 220. For example, the battery charging station 200 may route advertisements supplied from content servers such as the advertising server 222 of the network 220 to the networked electronic devices 130a-130g. The advertisements may be displayed on the networked electronic devices, for example, when they are being charged and/or not being utilized. In another example, the battery charging station 200 may support communication to provide users of the electronic device 300 with access to various networking services such as email, chat, web browsing, video conferencing, web services and/or web applications. In another example, the battery charging station 200 may be operable to download software and/or media data from the network 220. The battery charging station 200 may share the downloaded software and/or media data among the networked electronic devices 130a-130g when needed. In another example, the battery charging station 200 may be operable to upload software and/or media data from intended electronic devices such as the networked electronic devices 130a-130g. The battery charging station 200 may communicate with the network 220 to share the uploaded software and/or media data among subscribers of the network 220.

Figure 6:
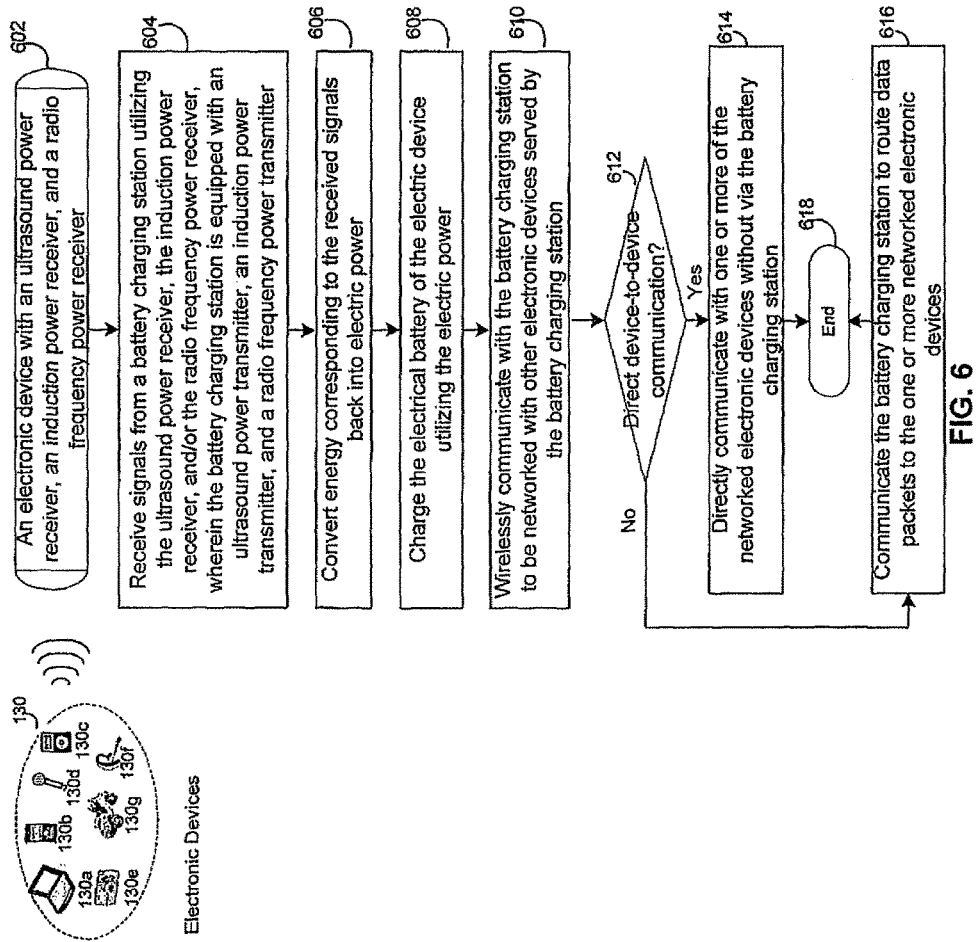
FIG. 6 is a diagram illustrating exemplary steps utilized by an electronic device to perform device-to-device communication, in accordance with an embodiment of the invention.

FIG. 6 is a diagram illustrating exemplary steps utilized by an electronic device to perform device-to-device communication, in accordance with an embodiment of the invention. Referring to FIG. 6, in step 602, the electronic device 300 is equipped with the RF power receiver 312, the induction power receiver 316, and the ultrasound power receiver 314. The exemplary steps start with step 604, where the electronic device 300 may be operable to detect and receive signals from the battery charging station 200 that is equipped with the RF power transmitters 214a, the induction power transmitters 214b, and the ultrasound power transmitters 214c. In step 606, RF energy, ultrasound energy and induction energy for the received signals may be converted into electronic power.

In step 608, the battery charger 320 may utilize the electronic power supplied from the RF power receiver 312, the induction power receiver 316, and the ultrasound power receiver 314 to charge the battery 330. In step 610, the electronic device circuitry 340 may utilize the data communicators 350 to wirelessly communicate with the battery charging station 200 so as to be networked with other served electronic devices such as the networked electronic devices 130a-130g. In step 612, it may be determined if direct device-to-device communication is expected among the networked electronic devices 300 and 130a-130g. In instances where a direct device-to-device communication is preferred, then in step 614, the networked electronic device 300 may directly communicate with intended networked electronic devices such as the networked electronic devices 130a-130g without intervening the battery charging station 200. With regard to the direct device-to-device communication, the networked electronic device 300 may perform peer-to-peer communication with intended networked electronic devices such as the networked electronic device 130b utilizing Bluetooth or Near field communication (NFC). The networked electronic device 300 may communicate with intended networked electronic devices such as the networked electronic device 130c through other networks utilizing WLAN access points and/or cellular base stations, for example.

In step 612, in instances where an in-direct device-to-device communication is preferred, then in step 616, the networked electronic device 300 may communicate with the battery charging station 200 for routing data packets for communication between the networked electronic device 300 with each intended networked electronic device such as the networked electronic devices 130a-130g. The exemplary steps end in step 618.

Figure 7:
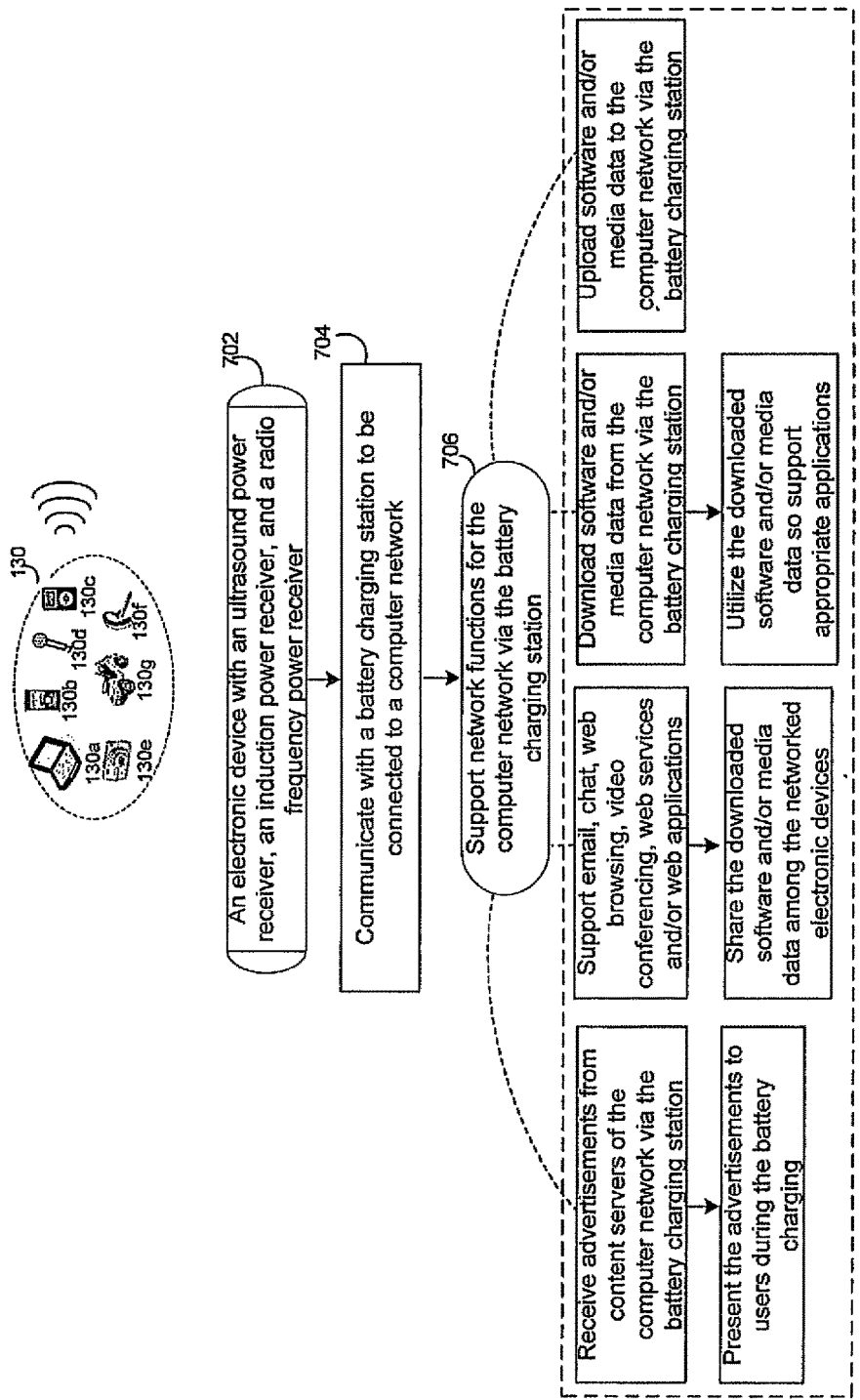
FIG. 7 is a diagram illustrating exemplary steps utilized by an electronic device to connect to a computer network to support network functions, in accordance with an embodiment of the invention.

FIG. 7 is a diagram illustrating exemplary steps utilized by an electronic device to connect to a computer network to support network functions, in accordance with an embodiment of the invention. Referring to FIG. 7, in step 702, the electronic device 300 is equipped with the RF power receiver 312, the induction power receiver 316, and the ultrasound power receiver 314. The exemplary steps start with step 704, where the electronic device 300 may be operable to communicate with the battery charging station 200 to be connected to a computer network such as the network 220. In step 706, the electronic device 300 may be configured to support network functions for the network 220. For example, the electronic device 300 may receive network advertisements routed by the battery charging station 200. The electronic device 300 may present the network advertisements to users during or after the battery charging. In another example, the electronic device 300 may be operable to download software and/or media data via the battery charging station 200 from the network 220. The battery charging station 200 may utilize the downloaded software and/or media data to support appropriate application such as media playback. In another example, the electronic device 300 may be operable to upload software and/or media data to the network 220 via the network 220. In another example, the electronic device 300 may support communication to provide users of the electronic device 300 with access to various networking services such as email, chat, web browsing, video conferencing, web services and/or web applications.

Aspects of a method and system for a battery charging station using multiple types of power transmitters for wireless battery charging are provided. In accordance with various exemplary embodiments of the invention, as described with respect to FIG. 1 through FIG. 7, the battery charging station 200 is equipped with the RF power transmitters 214a, the induction power transmitters 214b, and the ultrasound power transmitters 214c. The battery charging station 200 may be operable to concurrently charge a plurality of electronic devices such as the electronic devices 130a-130g utilizing the RF power transmitters 214a, the induction power transmitters 214b, and the ultrasound power transmitters 214c. The battery charging station 200 may be operable to network the electronic devices 130a-130g through wireless communication. In this regard, the battery charging station 200 may coordinate or arrange the RF power transmitters 214a, the induction power transmitters 214b and/or the ultrasound power transmitters 214c so that the resulting power transmission from the battery charging station 200 to one or more intended electronic devices such as the electronic devices 130a-130g may be maximized. In an embodiment of the invention, the battery charging station 200 may wirelessly communicate with the electronic devices 130a-130g for device networking. The battery charging station 200 may connect the networked electronic devices 130a-130g to a computer network such as the network 220 for network services. The network 220 may comprise an intranet, an extranet, and/or the Internet. The battery charging station 200 may be enabled to route software and/or media content between the network 220 and the networked electronic devices 130a-130g. In this regard, the media content may comprise network advertising supplied from the advertising server 222 of the network 220. The networked electronic devices 130a-130g may be operable to present the network advertisements to users during battery charging. The networked electronic devices 130a-130g may perform in-direct device-to-device communication via the battery charging station 200. Direct device-to-device communication may be performed among the networked electronic devices 130a-130g without intervening the battery charging station 200 in-between. The battery charging station 200 may dedicate a portion of the RF power transmitters 214a, the induction power transmitters 214b, and the ultrasound power transmitters 214c to data communication with the electronic device 130, for example, while the rest may be utilized and optimized for charging the electronic device 130a.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a battery charging station using multiple types of power transmitters for wireless battery charging.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of radio frequency (RF) power transmission to selectively charge an electronic device, said method comprising:
identifying said electronic device;
configuring one or more antennas to provide RF power from an RF power transmitter;
providing said RF power to a geographic area of interest for RF power transmission to said identified electronic device when a user preference allows for receiving wireless power within said geographic area of interest.

2. The method of claim 1 wherein said identified electronic device in said geographic area of interest is charged when device identification information is registered.

3. The method of claim 2 wherein said user preference allows for receiving power to wirelessly charge said identified electronic device.

4. The method of claim 2 wherein said device identification information includes at least one of media access control address (MAC ID), network IP address, name, serial number, product name, product manufacturer, and product capabilities.

5. The method of claim 1 wherein said RF power is focused on a sensed location of a battery adapter of said identified electronic device in said geographic area of interest.

6. A method of radio frequency (RF) power transmission to selectively charge an electronic device, said method comprising:
identifying said electronic device;
configuring one or more antennas to form an RF beam using RF signals from a power transmitter;
focusing said RF beam to a sensed location in a geographic area of interest of said identified electronic device for power transmission to said identified electronic device, and to avoid transmitting power to non-sensed locations not in said geographic area of interest;
wherein a user preference allows for receiving power to wirelessly charge said identified electronic device.

7. The method of claim 6 wherein said RF beam is focused on a battery adapter that provides power to said identified electronic device.

8. The method of claim 6 wherein said RF beam is focused on a battery adapter that and provides power only to said identified electronic device.

9. The method of claim 6 wherein said RF beam is focused on an RF power receiver of said identified electronic device.

10. The method of claim 6 wherein said identified electronic device is not charged when device identification information is not registered.

11. The method of claim 10 wherein said device identification information includes at least one of media access control address (MAC ID), network IP address, name, serial number, product name, product manufacturer, and product capabilities.

12. The method of claim 6 wherein a user preference allows for receiving wireless power within said geographic area of interest.

13. The method of claim 6 further comprising steering said RF beam to focus said RF beam on said identified electronic device in response to a change in location of said identified electronic device.

14. A method of radio frequency (RF) power transmission to selectively charge an electronic device, said method comprising:
identifying said electronic device;
configuring one or more antennas to form an RF beam using RF signals from a power transmitter;
focusing said RF beam to a sensed location in a geographic area of interest of said identified electronic device for power transmission to said identified electronic device;
wherein a user preference allows for receiving wireless power within said geographic area of interest.

15. The method of claim 14 wherein said RF beam is focused on a battery adapter that provides power to said identified electronic device.

16. The method of claim 14 wherein said RF beam is focused on an RF power receiver of said identified electronic device.

17. The method of claim 14 wherein said identified electronic device is not charged when device identification information is not registered.

18. The method of claim 14 wherein a user preference allows for receiving power to wirelessly charge said identified electronic device.

19. A method of radio frequency (RF) power transmission to selectively charge an electronic device, said method comprising:
identifying said electronic device;
configuring one or more antennas to form an RF beam using RF signals from a power transmitter; and
focusing said RF beam to a sensed location in a geographic area of interest of said identified electronic device for power transmission to said identified electronic device when a user preference allows said identified electronic device to be charged using said power.

20. The method of claim 19 wherein said RF beam is focused on a battery adapter that provides power to said identified electronic device.

21. The method of claim 19 wherein said RF beam is focused on a battery adapter that and provides power only to said identified electronic device.

22. The method of claim 19 wherein said RF beam is focused on an RF power receiver of said identified electronic device.

23. The method of claim 19 wherein said identified electronic device is not charged when device identification information is not registered.

24. The method of claim 23 wherein said device identification information includes at least one of media access control address (MAC ID), network IP address, name, serial number, product name, product manufacturer, and product capabilities.

25. The method of claim 19 wherein the user preference allows said identified electronic device to be charged within said geographic area of interest.

26. The method of claim 19 further comprising steering said RF beam to focus said RF beam on said identified electronic device in response to a change in location of said identified electronic device.

27. The method of claim 19 wherein said user preference allows for power transmission to said identified electronic device.

28. The method of claim 19 further comprises avoiding power transmission to locations outside of said geographic area of interest.

* * * * *